(12) United States Patent
Kusunoki et al.

(10) Patent No.: US 9,815,982 B2
(45) Date of Patent: Nov. 14, 2017

(54) CONDENSATION-CURABLE SILICONE RESIN COMPOSITION

(71) Applicant: SHIN-ETSU CHEMICAL CO., LTD., Tokyo (JP)

(72) Inventors: Takayuki Kusunoki, Annaka (JP); Yuusuke Takamizawa, Annaka (JP)

(73) Assignee: SHIN-ETSU CHEMICAL CO., LTD., Tokyo (JP)

(*) Notice: Subject to any disclaimer, the term of this patent is extended or adjusted under 35 U.S.C. 154(b) by 0 days.

(21) Appl. No.: 14/941,038

(22) Filed: Nov. 13, 2015

(65) Prior Publication Data

US 2016/0160047 A1    Jun. 9, 2016

(30) Foreign Application Priority Data

Dec. 8, 2014  (JP) ................. 2014-247935

(51) Int. Cl.
*C08G 77/12* (2006.01)
*C08L 83/06* (2006.01)
*C08G 77/16* (2006.01)
*C08G 77/18* (2006.01)

(52) U.S. Cl.
CPC .............. *C08L 83/06* (2013.01); *C08G 77/12* (2013.01); *C08G 77/16* (2013.01); *C08G 77/18* (2013.01)

(58) Field of Classification Search
CPC ......... C08L 83/06; C08G 77/12; C08G 77/16; C08G 77/18
See application file for complete search history.

(56) References Cited

U.S. PATENT DOCUMENTS

| | | | | |
|---|---|---|---|---|
| 4,489,191 A | * | 12/1984 | Chung ................ | C08K 5/54 524/779 |
| 5,166,293 A | * | 11/1992 | Okinoshima ........ | C08L 83/04 528/15 |
| 5,304,621 A | | 4/1994 | Staiger et al. | |
| 5,434,234 A | | 7/1995 | Stepp et al. | |
| 5,475,076 A | * | 12/1995 | Braun .................. | C08K 5/5419 523/209 |
| 8,519,063 B2 | * | 8/2013 | Taguchi .................. | C08L 83/04 525/474 |
| 2007/0099009 A1 | | 5/2007 | Shimizu et al. | |

FOREIGN PATENT DOCUMENTS

| | | |
|---|---|---|
| CA | 2148665 A1 | 12/1995 |
| DE | 40 29 481 A1 | 3/1992 |
| JP | H06-501286 A | 2/1994 |
| JP | H06-502677 A | 3/1994 |
| JP | H07-331077 A | 12/1995 |
| JP | 4781780 B2 | 9/2011 |
| JP | 4788837 B2 | 10/2011 |
| JP | 2011-219729 A | 11/2011 |

OTHER PUBLICATIONS

Mar. 21, 2016 Office Action issued in European Patent Application No. 15003298.5.
Jul. 25, 2017 Notification of Reasons for Refusal issued in Japanese Patent Application No. 2014-247935.

* cited by examiner

*Primary Examiner* — Margaret Moore
(74) *Attorney, Agent, or Firm* — Oliff PLC

(57) ABSTRACT

The present invention provides a condensation-curable silicone resin composition containing (A) 100 parts by mass of one or more polyorganosiloxanes represented by the following average composition formula (1): $(R_3SiO_{1/2})_x(R_2SiO_{2/2})_y(RSiO_{3/2})_w(SiO_{4/2})_u$ (1), and (B) 0.1 to 500 parts by mass of a polyorganosiloxane having one or more silicon-bonded hydrogen atoms and two or more silicon-bonded —OX groups per molecule, wherein at least one silicon atom is bonded to both of one or more hydrogen atoms and one or more —OX groups. There can be provided a condensation-curable silicone resin composition that can quickly provide a cured product having high heat resistance and light resistance.

8 Claims, No Drawings

CONDENSATION-CURABLE SILICONE RESIN COMPOSITION

BACKGROUND OF THE INVENTION

Field of the Invention

The present invention relates to a condensation-curable silicone resin composition.

Description of the Related Art

Until now, a condensation-curable polyorganosiloxane has been widely used for an adhesive, water-proof and moisture-proof coating material, insulator film, sealing material for architecture, etc. In recent years, use for a sealing material of a light emitting diode (LED) has attracted attention from the viewpoint of high heat resistance, light resistance, and transparency thereof. In such an industrial use, curing rate of a resin is important, however, a condensation-curable polyorganosiloxane has lower reactivity and thus poor productivity compared with an addition-curable polyorganosiloxane. Thus, there is a problem that the silicone resin cannot exhibit an inherent high heat resistance and light resistance since a large amount of condensation catalyst for enhancing the reactivity accelerates the deterioration of the silicone resin. In addition, some catalysts are unsuitable for a field requiring transparency since they have a color themselves or exhibit a color due to the deterioration.

So far, many attempts have been made to improve and utilize a condensation-curable polyorganosiloxane. For example, Patent Document 1 attempts to minimize the deterioration of a resin while enhancing the curing rate by adding, besides a metal catalyst such as aluminum or zinc, a condensation catalyst such as a phosphate ester or a boron compound to a polyorganosiloxane having two or more silanol groups per molecule and a polyorganosiloxane having two or more silicon-bonded alkoxy groups per molecule. In addition, as described in Patent Document 2, there has been an attempt inducing a silanol group or an alkoxy group into an addition-curable polyorganosiloxane composition having an alkenyl group and a hydrosilyl group to combine addition curing and condensation curing, thereby compensating disadvantages each other. Further, as described in Patent Document 3, there also has been an attempt previously increasing the molecular weight of a condensable polyorganosiloxane to reduce the number of reaction for gelation.

PRIOR ART DOCUMENTS

Patent Documents

Patent Document 1: Japanese Patent Laid-Open Publication No. 2011-219729
Patent Document 2: Japanese Patent No. 4788837
Patent Document 3: Japanese Patent No. 4781780

SUMMARY OF THE INVENTION

However, condensable polyorganosiloxane compositions as described above are not satisfactory for a field requiring high heat resistance and light resistance.

The present invention has been done in view of the above circumstances, and an object thereof is to provide a condensation-curable silicone resin composition that can quickly provide a cured product having high heat resistance and light resistance.

To accomplish the object, the present invention provides a condensation-curable silicone resin composition comprising:

(A) 100 parts by mass of one or more polyorganosiloxanes represented by the following average composition formula (1):

$$(R_3SiO_{1/2})_x(R_2SiO_{2/2})_y(RSiO_{3/2})_w(SiO_{4/2})_u \quad (1)$$

wherein R independently represents a monovalent hydrocarbon group having 1 to 18 carbon atoms and optionally having an oxygen atom, a halogen atom, a nitrogen atom, or a sulfur atom, and two or more R are an —OX group, wherein X represents a hydrogen atom, an alkyl group having 1 to 10 carbon atoms, or an alkoxyalkyl group having 2 to 10 carbon atoms; and "x", "y", "w", and "u" are each an integer of 0 to 1,000, and satisfy $2 \leq x+y+w \leq 3,000$; and (B) 0.1 to 500 parts by mass of a polyorganosiloxane having one or more silicon-bonded hydrogen atoms and two or more silicon-bonded —OX groups per molecule, wherein at least one silicon atom is bonded to both of one or more hydrogen atoms and one or more —OX groups, wherein X has the same meaning as above.

Such a condensation-curable silicone resin composition can quickly provide a cured product having high heat resistance and light resistance.

The condensation-curable silicone resin composition preferably does not contain a condensation catalyst.

A cured product obtained by the above condensation-curable silicone resin composition can exhibit high heat resistance and light resistance inherent in the silicone resin without occurrence of coloration of the resin due to a catalyst and deterioration of a catalyst since a condensation catalyst is not contained therein.

The component (B) is preferably selected from at least one of polyorganosiloxanes represented by the following general formula (2), general formula (3), and general formula (5),

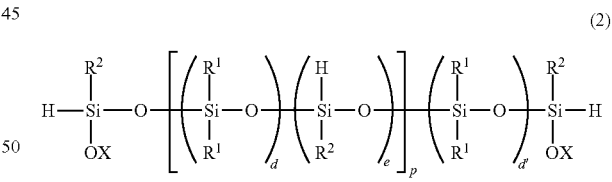

wherein X has the same meaning as above, $R^1$ independently represents a monovalent hydrocarbon group having 1 to 18 carbon atoms and optionally having an oxygen atom, a halogen atom, a nitrogen atom, or a sulfur atom; $R^2$ independently represents a monovalent hydrocarbon group having 1 to 18 carbon atoms and optionally having an oxygen atom, a halogen atom, a nitrogen atom, or a sulfur atom, or represents an —OX' group, wherein X' independently represents an alkyl group having 1 to 10 carbon atoms or an alkoxyalkyl group having 2 to 10 carbon atoms; "d" is an integer of 1 to 300; "e" is 0 or 1; when "e" is 0, d' is 0; when "e" is 1, d' is "d"; "p" is an integer of 1 or more; and the siloxane in the square brackets may form a random structure or a block structure,

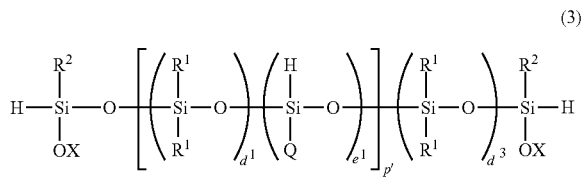
(3)

wherein $R^1$, $R^2$, and X have the same meanings as above; Q independently represents a monovalent hydrocarbon group having 1 to 18 carbon atoms and optionally having an oxygen atom, a halogen atom, a nitrogen atom, or a sulfur atom, or represents an —OX' group, wherein X' has the same meaning as above, or a group represented by the following general formula (4), provided that one or more Q is the group represented by the general formula (4); $d^1$ is an integer of 1 to 300; $e^1$ is 1; $d^3$ is $d^1$; p' is an integer of 1 or more; and the siloxane in the square brackets may form a random structure or a block structure,

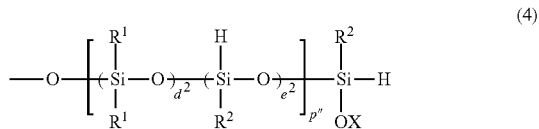
(4)

wherein $R^1$, $R^2$, and X have the same meanings as above; $d^2$ is an integer of 1 to 300; $e^2$ is 0 or 1; p" is an integer of 1 or more; and the siloxane in the square brackets may form a random structure or a block structure,

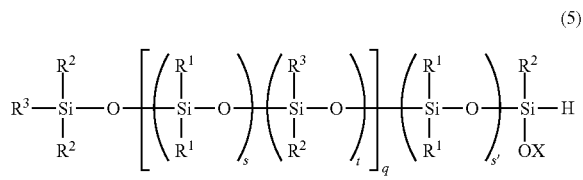
(5)

wherein $R^1$, $R^2$, and X have the same meanings as above; $R^3$ independently represents a hydrogen atom, a methyl group, a phenyl group, an alkenyl group having 2 to 10 carbon atoms, or a 3-glycidyloxypropyl group, provided that, when one or more $R^2$ bonding to the silicon atom at the end are —OX' groups, wherein X' has the same meaning above, $R^3$ bonding to the same silicon atom is not a hydrogen atom; "t" is 0 or 1; "s" is an integer of 0 to 300; when "t" is 0, s' is 0; when "t" is 1, s' is "s"; "q" is an integer of 1 or more; and the siloxane in the square brackets may form a random structure or a block structure.

When the component (B) is selected from the polyorganosiloxanes represented by the general formula (2), general formula (3), and general formula (5), sufficient curability can be obtained even when a condensation catalyst is not used.

In addition, the condensation-curable silicone resin composition is preferably gelated within 4 hours at 150° C.

Such a condensation-curable silicone resin composition can quickly provide a cured product, so that it is preferable.

The condensation-curable silicone resin composition of the present invention can be quickly cured even when a condensation catalyst is not contained therein. Further, a cured product obtained from the condensation-curable silicone resin composition of the present invention can exhibit high heat resistance and light resistance inherent in the silicone resin without occurrence of coloration of the resin due to a catalyst, deterioration of the resin, and deterioration of a catalyst since a condensation catalyst is not contained therein.

DETAILED DESCRIPTION OF THE PREFERRED EMBODIMENTS

As described above, there has been demanded a condensation-curable silicone resin composition that can quickly provide a cured product having high heat resistance and light resistance.

The present inventors have diligently studied to accomplish the above object and consequently found a condensation-curable silicone resin composition that has a rapid curability and can provide a cured product having high heat resistance and light resistance without a catalyst by condensation-curing of one or more polyorganosiloxanes having two or more silicon-bonded alkoxy groups or hydroxyl groups per molecule and one or more specific polyorganosiloxanes having one or more silicon-bonded hydrogen atoms and two or more silicon-bonded alkoxy groups or hydroxyl groups per molecule in which at least one silicon atom is bonded to both of one or more hydrogen atoms and one or more alkoxy groups or hydroxyl groups, thereby brought the present invention to completion.

Hereinafter, the present invention will be described in detail, but the present invention is not limited thereto.

Incidentally, in the present invention, Ph and Me represent a phenyl group and a methyl group, respectively.

The present invention is a condensation-curable silicone resin composition that contains:

(A) 100 parts by mass of one or more polyorganosiloxanes represented by the following average composition formula (1):

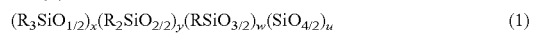
(1)

wherein R independently represents a monovalent hydrocarbon group having 1 to 18 carbon atoms and optionally having an oxygen atom, a halogen atom, a nitrogen atom, or a sulfur atom, and two or more R are an —OX group, wherein X represents a hydrogen atom, an alkyl group having 1 to 10 carbon atoms, or an alkoxyalkyl group having 2 to 10 carbon atoms; and "x", "y", "w", and "u" are each an integer of 0 to 1,000, and satisfy 2≤x+y+w≤3,000; and (B) 0.1 to 500 parts by mass of a polyorganosiloxane having one or more silicon-bonded hydrogen atoms and two or more silicon-bonded —OX groups per molecule, wherein at least one silicon atom is bonded to both of one or more hydrogen atoms and one or more —OX groups, wherein X has the same meaning as above.

[Component (A)]

The component (A) is one or more polyorganosiloxanes represented by the following general formula (1):

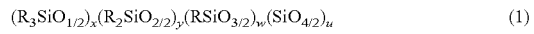
(1)

wherein R independently represents a monovalent hydrocarbon group having 1 to 18 carbon atoms and optionally having an oxygen atom, a halogen atom, a nitrogen atom, or a sulfur atom, and two or more R are an —OX group, wherein X represents a hydrogen atom, an alkyl group having 1 to 10 carbon atoms, or an alkoxyalkyl group having 2 to 10 carbon atoms; and "x", "y", "w", and "u" are each an integer of 0 to 1,000, and satisfy 2≤x+y+w≤3,000.

Preferable ranges of "x", "y", "w", and "u" are as follows: "x" is an integer of 0 to 300; "y" is an integer of 0 to 500;

"w" is an integer of 0 to 800; and "u" is an integer of 0 to 500. In addition, x+y+w is preferably in the range of 2≤x+y+w≤2,000, more preferably 20≤x+y+w≤1,000.

Such a polyorganosiloxane of component (A) can be synthesized by hydrolysis condensation of halogenated silane or alkoxysilane in accordance with a known method; or a commercial product may be used.

[Component (B)]

The component (B) is a polyorganosiloxane having one or more silicon-bonded hydrogen atoms and two or more silicon-bonded —OX groups per molecule in which at least one silicon atom is bonded to both of one or more hydrogen atoms and one or more —OX groups, wherein X has the same meaning as above.

The polyorganosiloxane of component (B) in the condensation-curable silicone resin composition of the present invention is preferably selected from at least one of polyorganosiloxanes represented by the general formula (2), general formula (3), and general formula (5) described later. When such a component (B) is employed, sufficient curability can be obtained even when a condensation catalyst is not used.

First, the polyorganosiloxane of component (B) is preferably a polyorganosiloxane represented by the general formula (2),

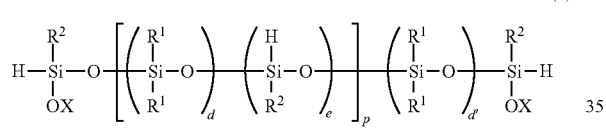
(2)

wherein X has the same meaning as above, $R^1$ independently represents a monovalent hydrocarbon group having 1 to 18 carbon atoms and optionally having an oxygen atom, a halogen atom, a nitrogen atom, or a sulfur atom; $R^2$ independently represents a monovalent hydrocarbon group having 1 to 18 carbon atoms and optionally having an oxygen atom, a halogen atom, a nitrogen atom, or a sulfur atom, or represents an —OX' group, wherein X' independently represents an alkyl group having 1 to 10 carbon atoms or an alkoxyalkyl group having 2 to 10 carbon atoms; "d" is an integer of 1 to 300; "e" is 0 or 1; when "e" is 0, d' is 0; when "e" is 1, d' is "d"; "p" is an integer of 1 or more; and the siloxane in the square brackets may form a random structure or a block structure.

Examples of the compound represented by the general formula (2) include the following compounds.

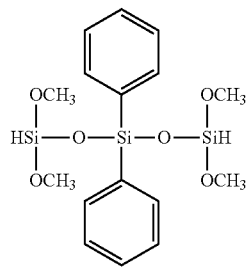

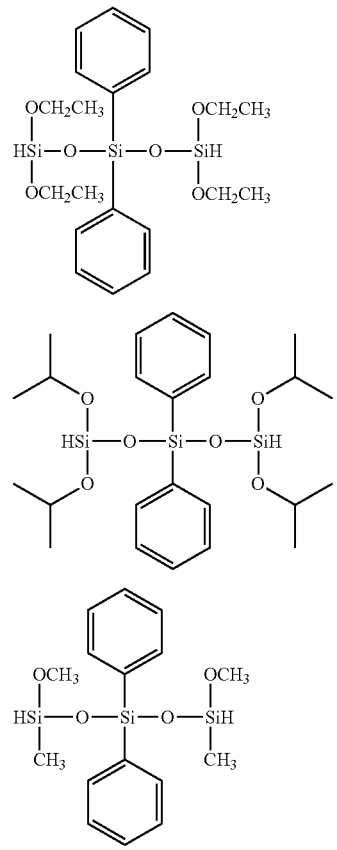

Other examples of the compound represented by the general formula (2) are as follows.

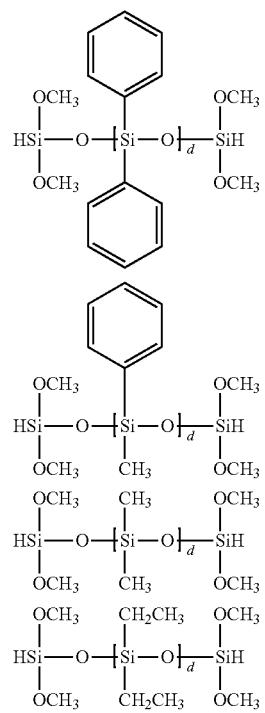

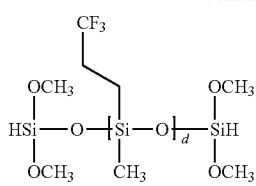

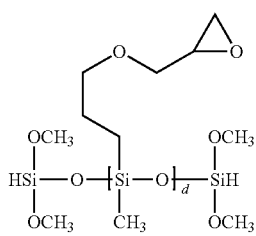

wherein d has the same meaning as above.

Besides, in the present invention, the compound having a branched structure as represented by the general formula (3) may also be suitably used as the polyorganosiloxane of component (B),

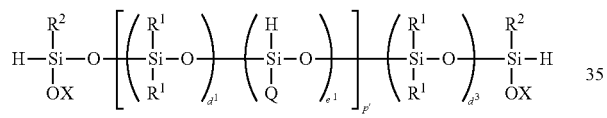

(3)

wherein $R^1$, $R^2$, and X have the same meanings as above; Q independently represents a monovalent hydrocarbon group having 1 to 18 carbon atoms and optionally having an oxygen atom, a halogen atom, a nitrogen atom, or a sulfur atom, or represents an —OX' group, wherein X' has the same meaning as above, or a group represented by the following general formula (4), provided that one or more Q is the group represented by the general formula (4); $d^1$ is an integer of 1 to 300; $e^1$ is 1; $d^3$ is $d^1$; p' is an integer of 1 or more; and the siloxane in the square brackets may form a random structure or a block structure,

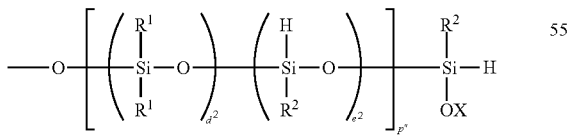

(4)

wherein $R^1$, $R^2$, and X have the same meanings as above; $d^2$ is an integer of 1 to 300; $e^2$ is 0 or 1; p" is an integer of 1 or more; and the siloxane in the square brackets may form a random structure or a block structure.

Examples of the compound represented by the general formula (3) include the following compounds.

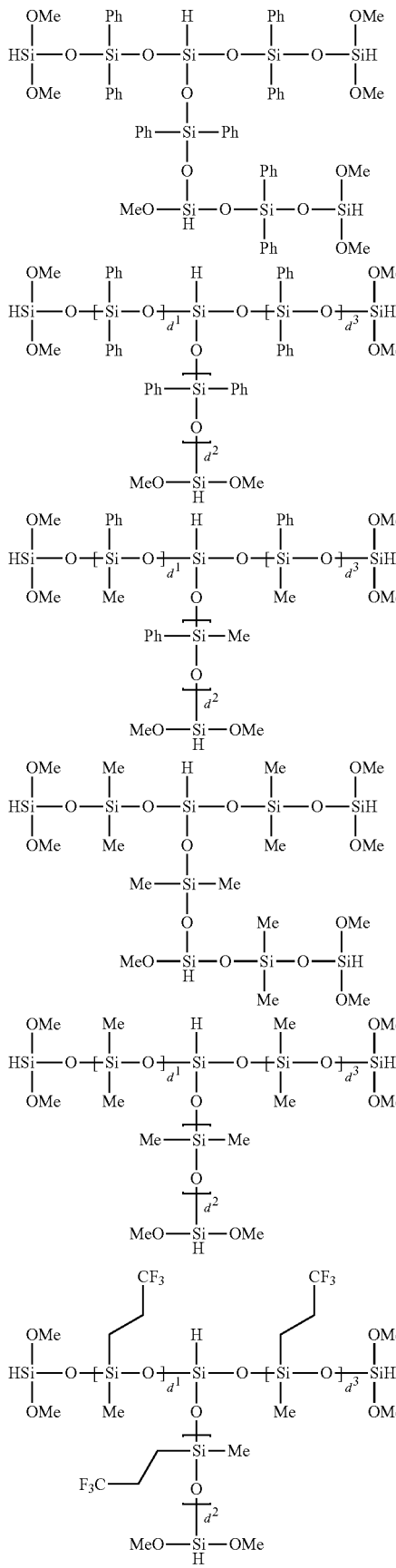

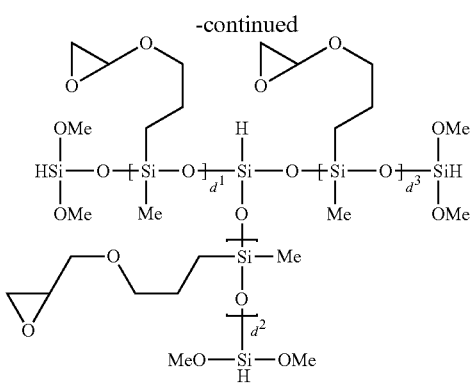

wherein $d^1$, $d^2$, and $d^3$ have the same meanings as above.

Further, in the present invention, the compound represented by the general formula (5) also can be suitably used as the polyorganosiloxane of component (B). By using such a compound, curability can be properly adjusted.

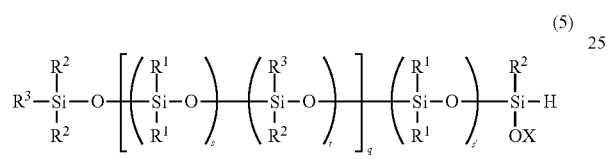
(5)

wherein $R^1$, $R^2$, and X have the same meanings as above; $R^3$ independently represents a hydrogen atom, a methyl group, a phenyl group, an alkenyl group having 2 to 10 carbon atoms, or a 3-glycidyloxypropyl group, provided that, when one or more $R^2$ bonding to the silicon atom at the end are —OX' groups, wherein X' has the same meaning above, $R^3$ bonding to the same silicon atom is not a hydrogen atom; "t" is 0 or 1; "s" is an integer of 0 to 300; when "t" is 0, s' is 0; when "t" is 1, s' is "s"; "q" is an integer of 1 or more; and the siloxane in the square brackets may form a random structure or a block structure.

Examples of the compound represented by the general formula (5) include the following compounds.

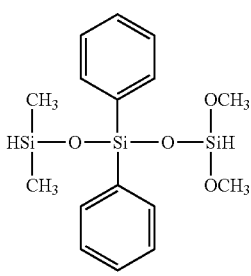

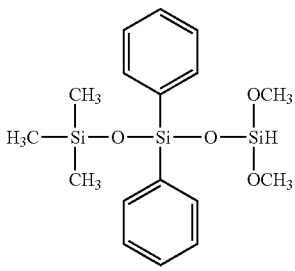

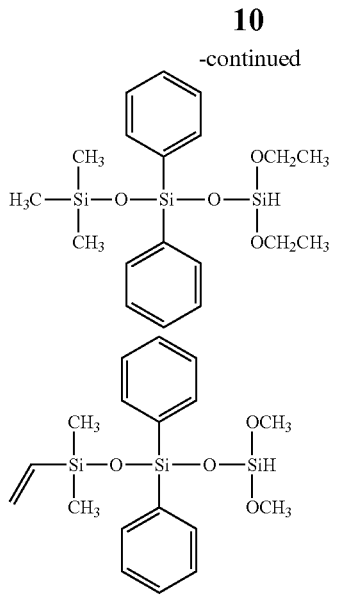

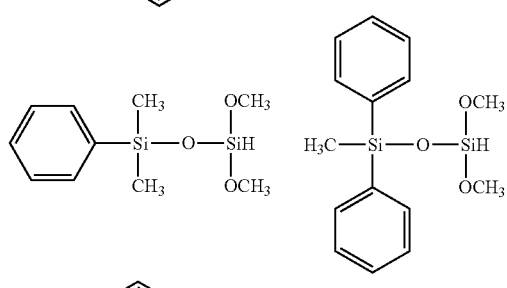

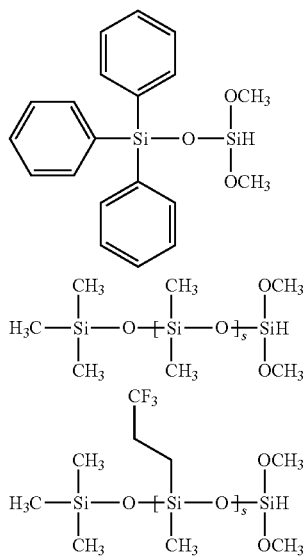

wherein "s" has the same meaning as above.

In the condensation-curable silicone resin composition of the present invention, the component (A) and the component (B) are blended in such amount that the amount of the component (B) is 0.1 to 500 parts by mass, preferably 0.5 to 500 parts by mass, more preferably 1 to 500 parts by mass, based on a total of 100 parts by mass of the component (A).

[Other Component]

The condensation-curable silicone resin composition of the present invention may further contain other components. Examples of the other component include inorganic fillers such as a white pigment, silica, and a luminous substance, a diluent, a pH adjusting agent, and an antioxidant.

Examples of the inorganic filler include oxides, sulfides, and various complex oxides each containing a metal such as Si, Al, Ti, Zr, Fe, Ca, Mg, Sr, Ba, Y, Zn, Cu, Cr, Nb, Ce, Mn, Sn, Cd, Se, Li, Co, and Eu or a nonmetal element, and composite compounds thereof.

Examples of the diluent include solvents such as toluene, xylene, cyclohexanone, polyethylene glycol monomethyl ether, and methyl isobutyl ketone, and a non-reactive short-chain silicone oil.

Examples of the pH adjusting agent include organic acids such as acetic acid and citric acid, and organic bases such as pyridine and N,N-dimethylaniline.

Examples of the antioxidant include benzoic acid, isopropylmethylphenol, ethylhexanediol, lysozyme chloride, chlorhexidine hydrochloride, octylphenoxyethanol, and orthophenylphenol.

In addition, the condensation-curable silicone resin composition of the present invention preferably does not contain a condensation catalyst. A cured product obtained from such a condensation-curable silicone resin composition can exhibit high heat resistance and light resistance inherent in the silicone resin without occurrence of coloration of the resin due to a catalyst and deterioration of a catalyst. However, depending on the purpose, a small amount of a condensation catalyst may be added.

<Preparation of Condensation-Curable Silicone Resin Composition>

The condensation-curable silicone resin composition of the present invention can be prepared by a known method. That is, the condensation-curable silicone resin composition of the present invention can be prepared by stirring and mixing the components with a rotation/revolution type mixer, planetary mixer, or 3-rolls, etc.

The curing temperature of the condensation-curable silicone resin composition of the present invention can be adjusted so as to be cured in a desired curing time. The curing temperature is preferably in the range of 20° C. to 200° C., more preferably 60° C. to 180° C. In addition, the condensation-curable silicone resin composition is more preferably cured at step-by-step curing temperatures for the purpose of inhibiting bubbles due to volatile components.

In addition, the condensation-curable silicone resin composition of the present invention is preferably gelated within 4 hours at 150° C.

The condensation-curable silicone resin composition of the present invention can be cured in a short time even when a condensation catalyst is not used, so that it is industrially advantageous. Moreover, a cured product obtained from the condensation-curable silicone resin composition of the present invention is excellent in heat resistance and light resistance. Therefore, it is significantly useful for a sealing material of a semiconductor, LED, or solar cell, etc., which is exposed to severe conditions.

EXAMPLES

Hereinafter, the present invention will be described in more detail with reference to examples, but the present invention is not restricted thereto.

Components (A) used in Examples and Comparative Examples are shown below.

(A-1) Methylphenyl type silicone resin consisting of T unit (available from Shin-Etsu Chemical Co., Ltd., SiOH content: 1.5 wt %, $SiOCH_3$ content: 3.0 wt %, 50 wt % xylene solution)

(A-2) Methyl type silicone resin consisting of M unit and Q unit (available from Shin-Etsu Chemical Co., Ltd., SiOH content: 1.2 wt %, 60 wt % toluene solution)

(A-3) Methylphenyl silicone oil having hydroxyl groups at both terminals (available from Shin-Etsu Chemical Co., Ltd., represented by the following general formula:)

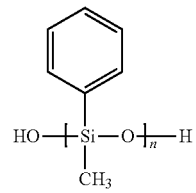

wherein "n" is 12 on average.

Structures of components (B) used in Examples and Comparative Examples are shown below.

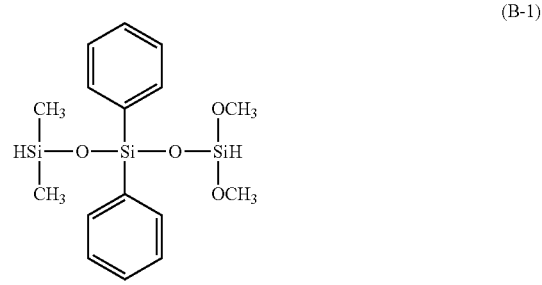

(B-1)

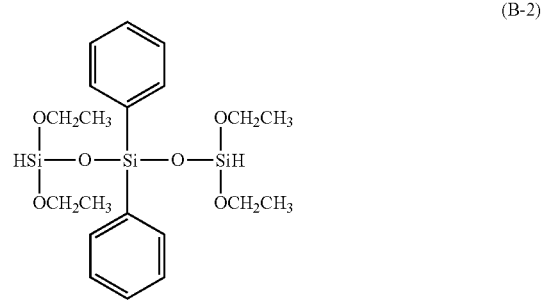

(B-2)

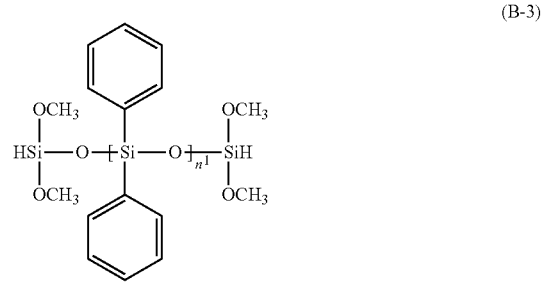

(B-3)

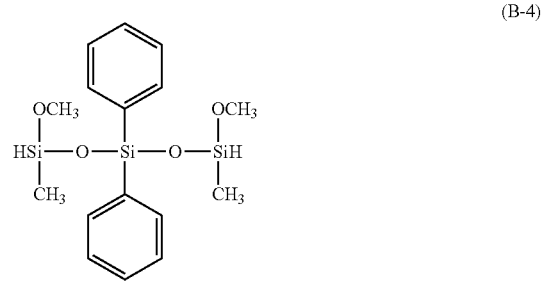

(B-4)

-continued

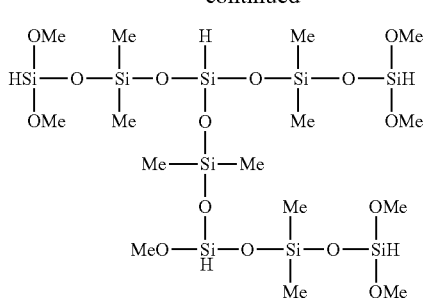 (B-5)

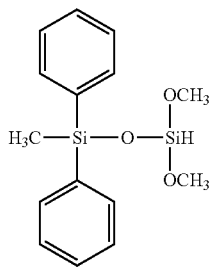 (B-6)

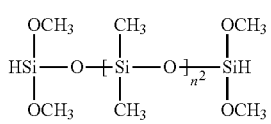 (B-7)

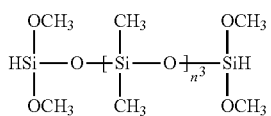 (B-8)

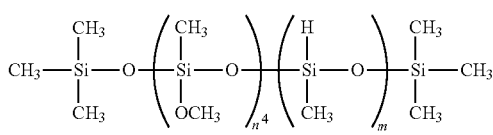 (B-9)

wherein $n^1$ is 4 on average; $n^2$ is 20 on average; $n^3$ is 200 on average; $n^4$ is 6 on average; and "m" is 32 on average.

Examples 1 to 10

After the components are mixed as shown in Table 1-1, the solvent was distilled off under reduced pressure at 80° C. to prepare a condensation-curable silicone resin composition. Note that the amount of component (A) shown in Table 1-1 and Table 1-2 is an amount excluding a solvent. Also, the amounts of component (A), component (B), and a later-described catalyst shown in Table 1-1 and Table 1-2 are expressed in part by mass.

[Measurement of Gelation Time]

According to a procedure described in Japanese Industrial Standard (JIS) K 6910, about 0.5 g of the prepared condensation-curable silicone resin composition was placed on a hot plate heated at 150° C., and a stopwatch was simultaneously started. Then, after placing the sample on a hot plate, the sample was quickly moved back and forth by the edge of a metal spatula (with a length of about 10 cm and a width of about 1.25 cm) so as to uniformly spread into an area of about 4 cm×7.5 cm. The sample was further reciprocately moved with 3 seconds there and back under a slight pressure until a point the sample becomes not-sticky, and this point was recorded. This measurement was performed 3 times, and the average values thereof are shown in Table 1-1.

[Evaluation of Heat Resistance and Crack Resistance]

Four edges of a slide glass with a size of 26 mm×76 mm×1 mm were surrounded by a dam formed of 1.08 mm-six-layered Teflon (registered trademark) tape (each tape having a thickness of 180 μm). The condensation-curable silicone resin composition prepared in Example was put into an area surrounded by the dam, and successively heated at 60° C. for 1 hour, at 100° C. for 1 hour, and at 150° C. for 4 hours step-by-step to obtain a cured product of the condensation-curable silicone resin composition with a thickness of 1 mm. With respect to the obtained cured product of the condensation-curable silicone resin composition, the presence of cracks was examined, and the initial transmittance at a light wavelength of 450 nm was measured with a visible-ultraviolet spectrophotometer. Thereafter, the sample was left to stand in an oven at 200° C. for 2,000 hours, and the transmittance at a light wavelength of 450 nm was measured again. In addition, the presence of cracks and the color of the cured product of the condensation-curable silicone resin composition after 2,000 hours at 200° C. were visually observed. The results are shown in Table 1-1.

[Evaluation of Light Resistance]

A cured product of the condensation-curable silicone resin composition produced for the heat resistance evaluation was exposed to a laser beam with a wavelength of 440 nm (power: 250 mW/mm$^2$) for 1,000 hours at 180° C. by a laser irradiation device having a temperature adjusting function (light source: UV-LED manufactured by NICHIA CO., oven: STH-120 manufactured by ESPEC Co., detector: R8240 manufactured by Advantest component, Inc.). By defining the initial transmittance (0 hour) at 440 nm as 100%, transmittance after a laser was irradiated for 1,000 hours was relatively measured. In addition, the presence of cracks and the color of the cured product of the condensation-curable silicone resin composition after 1,000 hours were visually observed. The results are shown in Table 1-1.

Comparative Example 1

A condensation-curable silicone resin composition was prepared by using (A-1) alone, and evaluated in the same manner as in Examples 1 to 10. The results are shown in Table 1-2.

Comparative Example 2

A condensation-curable silicone resin composition was prepared in the same manner as in Example 9 except for adding (B-9) instead of (B-7) and evaluated in the same manner as in Examples 1 to 10. The results are shown in Table 1-2.

Comparative Example 3

A condensation-curable silicone resin composition was prepared by adding, as a condensation catalyst (Catalyst 1), Aluminum chelate D (available from Kawaken Fine Chemicals Co., Ltd.) to the condensation-curable silicone resin composition of Comparative Example 2, and evaluated in the same manner as in Examples 1 to 10. The results are shown in Table 1-2.

TABLE 1-1

| | | Example 1 | Example 2 | Example 2 | Example 4 | Example 5 | Example 6 | Example 7 | Example 8 | Example 9 | Example 10 |
|---|---|---|---|---|---|---|---|---|---|---|---|
| Component (A) | (A-1) | 100 | 70 | 100 | 100 | 85 | 100 | 90 | 100 | — | — |
| | (A-2) | — | — | — | — | — | — | — | — | 100 | 100 |
| | (A-3) | — | 30 | — | — | 15 | — | 10 | — | — | — |
| Component (B) | (B-1) | 20 | 1 | 100 | — | — | — | — | — | — | — |
| | (B-2) | — | — | — | 30 | — | — | — | — | — | — |
| | (B-3) | — | — | — | — | 5 | — | — | — | — | — |
| | (B-4) | — | — | — | — | — | 20 | — | — | — | — |
| | (B-5) | — | — | — | — | — | — | 10 | — | — | — |
| | (B-6) | — | — | — | — | — | — | — | 20 | — | — |
| | (B-7) | — | — | — | — | — | — | — | — | 40 | — |
| | (B-8) | — | — | — | — | — | — | — | — | — | 500 |
| | (B-9) | — | — | — | — | — | — | — | — | — | — |
| Catalyst 1 | | — | — | — | — | — | — | — | — | — | — |
| Gelation time (min) | | 12 | 60 | 20 | 51 | 27 | 22 | 14 | 25 | 33 | 46 |
| Heat resistance evaluation | Initial transmittance (%) | 99.4 | 98.6 | 99.3 | 99.4 | 98.1 | 99.5 | 99.0 | 99.0 | 99.6 | 99.5 |
| | Transmittance after 2000 hours (%) | 98.8 | 97.3 | 98.6 | 98.7 | 96.4 | 98.8 | 98.2 | 98.3 | 99.2 | 99 |
| | Difference between transmittances of initial and after 2000 hours (%) | −0.6 | −1.3 | −0.7 | −0.7 | −1.7 | −0.7 | −0.8 | −0.7 | −0.4 | −0.5 |
| | Appearance color after 2000 hours | colorless | colorless | colorless | colorless | colorless | colorless | colorless | colorless | colorless | colorless |
| | Presence of initial crack | none | none | none | none | none | none | none | none | none | none |
| | Presence of crack after 2000 hours | none | none | none | none | none | none | none | none | none | none |
| Light resistance evaluation | Transmittance after 1000 hours (%) *1 | 99.1 | 98.0 | 98.9 | 99.0 | 97.2 | 99.3 | 98.6 | 98.8 | 99.5 | 99.4 |
| | Difference between transmittances of initial and after 1000 hours (%) | −0.9 | −2.0 | −1.1 | −1.0 | −2.8 | −0.7 | −1.4 | −1.2 | −0.5 | −0.6 |
| | Appearance color after 1000 hours | colorless | colorless | colorless | colorless | colorless | colorless | colorless | colorless | colorless | colorless |
| | Presence of crack after 1000 hours | none | none | none | none | none | none | none | none | none | none |

TABLE 1-2

| | | Comparative Example 1 | Comparative Example 2 | Comparative Example 3 |
|---|---|---|---|---|
| Component (A) | (A-1) | 100 | — | — |
| | (A-2) | — | 100 | 100 |
| | (A-3) | — | — | — |
| Component (B) | (B-1) | — | — | — |
| | (B-2) | — | — | — |
| | (B-3) | — | — | — |
| | (B-4) | — | — | — |
| | (B-5) | — | — | — |
| | (B-6) | — | — | — |
| | (B-7) | — | — | — |
| | (B-8) | — | — | — |
| | (B-9) | — | 40 | 40 |
| Catalyst 1 | | — | — | 3.5 |
| Gelation time (min) | | not cured at 150° C. for 4 hours | not cured at 150° C. for 4 hours | 38 |
| Heat resistance evaluation | Initial transmittance (%) | | | 99.3 |
| | Transmittance after 2000 hours (%) | | | 87.1 |
| | Difference between transmittances of initial and after 2000 hours (%) | | | −12.2 |

TABLE 1-2-continued

|  |  | Comparative Example 1 | Comparative Example 2 | Comparative Example 3 |
|---|---|---|---|---|
| Light resistance evaluation | Appearance color after 2000 hours |  |  | yellow |
|  | Presence of initial crack |  |  | none |
|  | Presence of crack after 2000 hours |  |  | present |
|  | Transmittance after 1000 hours (%) *1 |  |  | 99.4 |
|  | Difference between transmittances of initial and after 1000 hours (%) |  |  | −20.2 |
|  | Appearance color after 1000 hours |  |  | yellow |
|  | Presence of crack after 1000 hours |  |  | present |

*1: Values when the initial transmittance was defined as 100%.

As shown in Table 1-1 and Table 1-2, Examples 1 to 10, which are the condensation-curable silicone resin compositions of the present invention, were cured at 150° C. for 4 hours although a condensation catalyst is not contained, and the obtained cured product was excellent in heat resistance and light resistance.

On the other hand, Comparative Example 1, which does not contain component (B), and Comparative Example 2, which contains component (B) different from the present invention, were not cured at 150° C. for 4 hours. Also, Comparative Example 3 obtained by adding a condensation catalyst to Comparative Example 2 was poor in heat resistance and light resistance although it was cured.

In addition, evaluation was performed for a condensation-curable silicone resin composition obtained by changing the amount of (B-1) in Example 2 to 0.5 part by mass (Example 11), and a condensation-curable silicone resin composition obtained by changing the amount of (B-1) in Example 2 to 0.1 part by mass (Example 12). As a result, it was revealed that the condensation-curable silicone resin composition of Example 11 was cured in 2 hours and the condensation-curable silicone resin composition of Example 12 was cured in 4 hours.

It should be noted that the present invention is not limited to the foregoing embodiment. The embodiment is just an exemplification, and any examples that have substantially the same feature and demonstrate the same functions and effects as those in the technical concept described in claims of the present invention are included in the technical scope of the present invention.

What is claimed is:

1. A condensation-curable silicone resin composition comprising:

(A) 100 parts by mass of two or more polyorganosiloxanes represented by the following average composition formula (1):

$$(R_3SiO_{1/2})_x(R_2SiO_{2/2})_y(RSiO_{3/2})_w(SiO_{4/2})_u \quad (1)$$

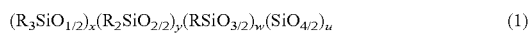

wherein R independently represents a monovalent hydrocarbon group having 1 to 18 carbon atoms and optionally having an oxygen atom, a halogen atom, a nitrogen atom, or a sulfur atom, and two or more R are an —OX group, wherein X represents a hydrogen atom, an alkyl group having 1 to 10 carbon atoms, or an alkoxyalkyl group having 2 to 10 carbon atoms; and "x", "y", "w", and "u" are each an integer of 0 to 1,000, and satisfy 2≤x+y+w≤3,000; and (B) 0.1 to 500 parts by mass of a polyorganosiloxane having one or more silicon-bonded hydrogen atoms and two or more silicon-bonded —OX groups per molecule, wherein at least one silicon atom is bonded to both of one or more hydrogen atoms and one or more OX groups, wherein X has the same meaning as above, wherein the component (A) comprises (i) one or more linear polyorganosiloxanes including only linear units, and (ii) one or more branched polyorganosiloxanes, and the component (A) has a ratio of an amount of the linear polyorganosiloxanes to an amount of the branched polyorganosiloxanes ranging from 10:90 to 30:70.

2. The condensation-curable silicone resin composition according to claim 1, wherein the condensation-curable silicone resin composition does not contain a condensation catalyst.

3. The condensation-curable silicone resin composition according to claim 1, wherein the component (B) is selected from at least one of polyorganosiloxanes represented by the following general formula (2), general formula (3), and general formula (5),

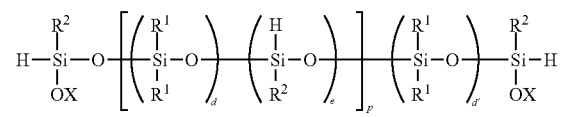

(2)

wherein X has the same meaning as above, $R^1$ independently represents a monovalent hydrocarbon group having 1 to 18 carbon atoms and optionally having an oxygen atom, a halogen atom, a nitrogen atom, or a sulfur atom; $R^2$ independently represents a monovalent hydrocarbon group having 1 to 18 carbon atoms and optionally having an oxygen atom, a halogen atom, a nitrogen atom, or a sulfur atom, or represents an —OX' group, wherein X' independently represents an alkyl group having 1 to 10 carbon atoms or an alkoxyalkyl group having 2 to 10 carbon atoms; "d" is an integer of 1 to 300; "e" is 0 or 1; when "e" is 0, d' is 0; when "e" is 1, d' is "d"; "p" is an integer of 1 or more; and the siloxane in the square brackets may form a random structure or a block structure,

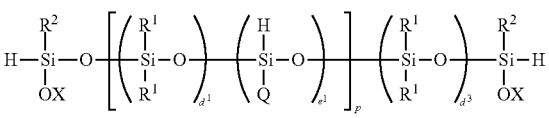

(3)

wherein $R^1$, $R^2$, and X have the same meanings as above; Q independently represents a monovalent hydrocarbon group having 1 to 18 carbon atoms and optionally having an oxygen atom, a halogen atom, a nitrogen atom, or a sulfur atom, or represents an —OX' group, wherein X' has the same meaning as above, or a group represented by the following general formula (4), provided that one or more Q is the group represented by the general formula (4); $d^1$ is an integer of 1 to 300; $e^1$ is 1; $d^3$ is $d^1$; p' is an integer of 1 or more; and the siloxane in the square brackets may form a random structure or a block structure,

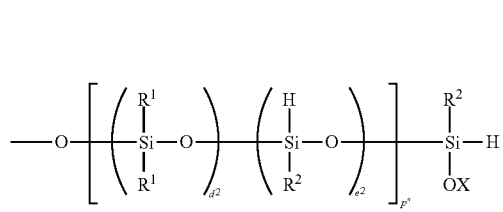

(4)

wherein $R^1$, $R^2$, and X have the same meanings as above; $d^2$ is an integer of 1 to 300; $e^2$ is 0 or 1; p" is an integer of 1 or more; and the siloxane in the square brackets may form a random structure or a block structure,

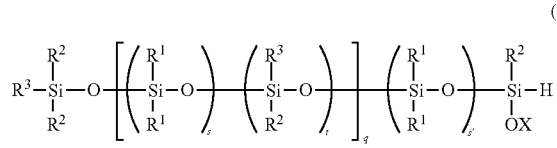

(5)

wherein $R^1$, $R^2$, and X have the same meanings as above; $R^3$ independently represents a hydrogen atom, a methyl group, a phenyl group, an alkenyl group having 2 to 10 carbon atoms, or a 3-glycidyloxypropyl group, provided that, when one or more $R^2$ bonding to the silicon atom at the end are —OX' groups, wherein X' has the same meaning above, $R^3$ bonding to the same silicon atom is not a hydrogen atom; "t" is 0 or 1; "s" is an integer of 0 to 300; when "t" is 0, s' is 0; when "t" is 1, s' is "s"; "q" is an integer of 1 or more; and the siloxane in the square brackets may form a random structure or a block structure.

4. The condensation-curable silicone resin composition according to claim 2, wherein the component (B) is selected from at least one of polyorganosiloxanes represented by the following general formula (2), general formula (3), and general formula (5),

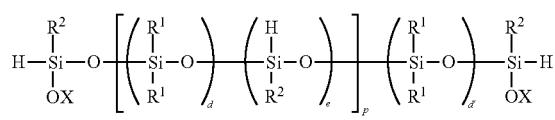

(2)

wherein X has the same meaning as above, $R^1$ independently represents a monovalent hydrocarbon group having 1 to 18 carbon atoms and optionally having an oxygen atom, a halogen atom, a nitrogen atom, or a sulfur atom; $R^2$ independently represents a monovalent hydrocarbon group having 1 to 18 carbon atoms and optionally having an oxygen atom, a halogen atom, a nitrogen atom, or a sulfur atom, or represents an —OX' group, wherein X' independently represents an alkyl group having 1 to 10 carbon atoms or an alkoxyalkyl group having 2 to 10 carbon atoms; "d" is an integer of 1 to 300; "e" is 0 or 1; when "e" is 0, d' is 0; when "e" is 1, d' is "d"; "p" is an integer of 1 or more; and the siloxane in the square brackets may form a random structure or a block structure,

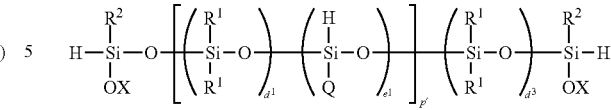

(3)

wherein $R^1$, $R^2$, and X have the same meanings as above; Q independently represents a monovalent hydrocarbon group having 1 to 18 carbon atoms and optionally having an oxygen atom, a halogen atom, a nitrogen atom, or a sulfur atom, or represents an —OX' group, wherein X' has the same meaning as above, or a group represented by the following general formula (4), provided that one or more Q is the group represented by the general formula (4); $d^1$ is an integer of 1 to 300; $e^1$ is 1; $d^3$ is $d^1$; p' is an integer of 1 or more; and the siloxane in the square brackets may form a random structure or a block structure,

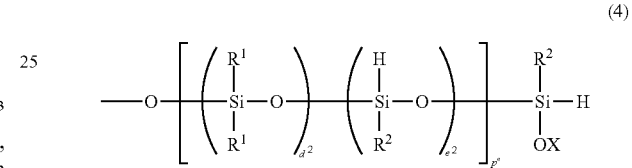

(4)

wherein $R^1$, $R^2$, and X have the same meanings as above; $d^2$ is an integer of 1 to 300; $e^2$ is 0 or 1; p" is an integer of 1 or more; and the siloxane in the square brackets may form a random structure or a block structure,

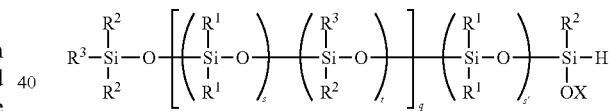

wherein $R^1$, $R^2$, and X have the same meanings as above; $R^3$ independently represents a hydrogen atom, a methyl group, a phenyl group, an alkenyl group having 2 to 10 carbon atoms, or a 3-glycidyloxypropyl group, provided that, when one or more $R^2$ bonding to the silicon atom at the end are —OX' groups, wherein X' has the same meaning above, $R^3$ bonding to the same silicon atom is not a hydrogen atom; "t" is 0 or 1; "s" is an integer of 0 to 300; when "t" is 0, s' is 0; when "t" is 1, s' is "s"; "q" is an integer of 1 or more; and the siloxane in the square brackets may form a random structure or a block structure.

5. The condensation-curable silicone resin composition according to claim 1, wherein the condensation-curable silicone resin composition is gelated within 4 hours at 150° C.

6. The condensation-curable silicone resin composition according to claim 2, wherein the condensation-curable silicone resin composition is gelated within 4 hours at 150° C.

7. The condensation-curable silicone resin composition according to claim 3, wherein the condensation-curable silicone resin composition is gelated within 4 hours at 150° C.

8. The condensation-curable silicone resin composition according to claim 4, wherein the condensation-curable silicone resin composition is gelated within 4 hours at 150° C.

\* \* \* \* \*